Figure 8:
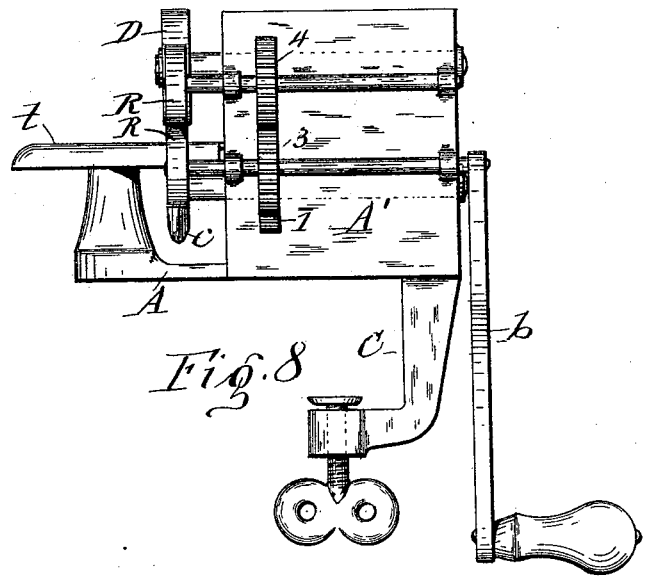

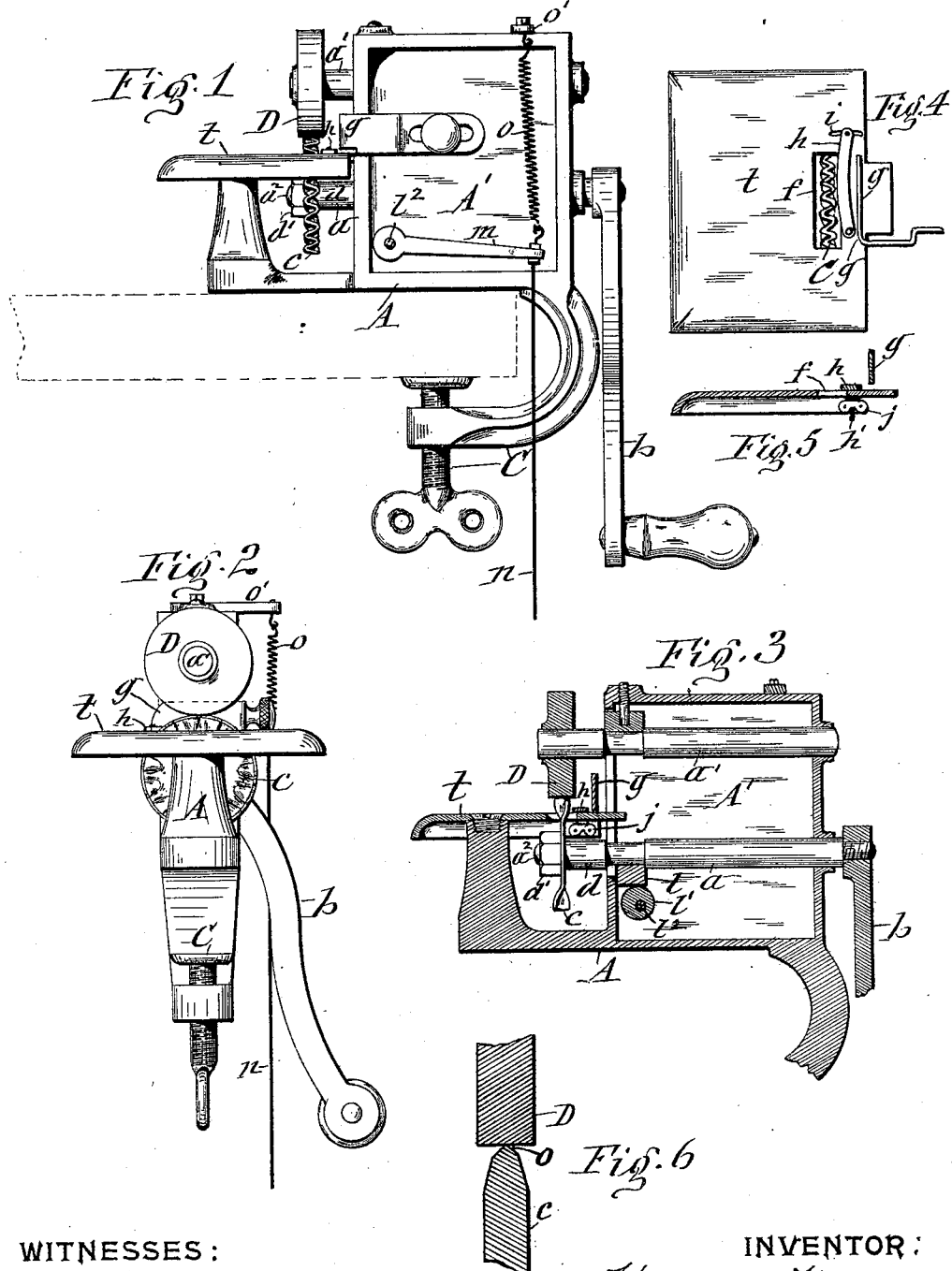

(No Model.) 2 Sheets—Sheet 2.

H. A. HANNUM.
ROTARY CUTTER.

No. 592,869. Patented Nov. 2, 1897.

WITNESSES:
J. J. Laass
M. A. Leyden

INVENTOR
Henry A Hannum
By E. Laass
his ATTORNEY

UNITED STATES PATENT OFFICE.

HENRY A. HANNUM, OF CAZENOVIA, NEW YORK.

ROTARY CUTTER.

SPECIFICATION forming part of Letters Patent No. 592,869, dated November 2, 1897.

Application filed June 4, 1896. Serial No. 594,337. (No model.)

*To all whom it may concern:*

Be it known that I, HENRY A. HANNUM, of Cazenovia, in the county of Madison, in the State of New York, have invented new and useful Improvements in Rotary Cutters, of which the following, taken in connection with the accompanying drawings, is a full, clear, and exact description.

The object of this invention is to provide a simple, convenient, and efficient machine for either trimming the edges of or cutting strips from sheet material, which may be either leather, or paper, or cloth, or metal, or any other material. Various machines have been devised and tried to perform the aforesaid functions, but the majority of them have failed to perfectly accomplish the desired result for various reasons. In said prior machines the rotary cutter usually consists of a thin steel disk, which in some cases is corrugated around its peripheral portion and sharpened to a thin knife-edge, and to preserve said edge the opposed roller or anvil was either mounted on a vertically-yielding shaft or provided with an elastic or suitably-cushioned peripheral face. The great objections to this style of machine are that they are unreliable in their operation, owing to the want of the requisite stability of the cutter and proper support for the sheet to insure the penetration of the cutter, and, in fact, such machines are incapable of cutting sheet metal or other hard material, and when the material to be cut is textile fabric or of a character to allow the corrugated cutter to readily penetrate it said material is liable to adhere to the thin cutter and become tangled, and, furthermore, such elastic surfaces of the bed-roller or anvil are readily worn out. Other machines of the aforesaid class have the anvil or bed-roller formed of metal and in some cases provided with scallops or sockets in its periphery to receive a correspondingly-shaped edge of the revolving cutter. In practice it is found that such machines are liable to become clogged and the thin cutting edges are rapidly worn out and are frequently broken. All of these defects are obviated in my present invention, which consists in the combination of a rotary annular cutter having its periphery beveled bluntly or abruptly to form a rotary cold-chisel having an obtuse-angled cutting ridge which may extend either straight or in a serpentine direction around the periphery, which latter form tends to draw the material to its position to be cut, in combination with an annular revoluble anvil having a transversely straight and smooth hard-metal peripheral face sustained uniformly in contact with said cold-chisel throughout the length of the line of cutting, whereby the severing of the interposed material is effected without danger of breaking the cutting edge of said cold-chisel; and the invention also consists in certain details of the machine, all as hereinafter more fully described, and set forth in the claims.

Figure 7:
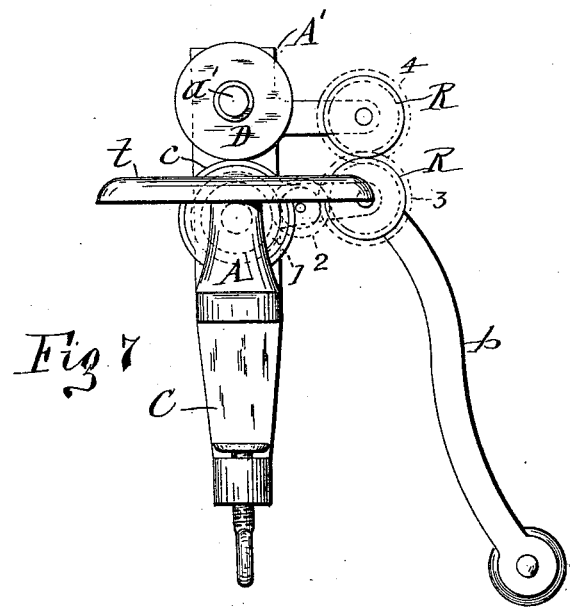

In the annexed drawings, Figure 1 is a side elevation of a machine embodying my invention. Fig. 2 is a front end view of the same. Fig. 3 is a vertical longitudinal section through said machine. Figs. 4 and 5 are detached plan and horizontal sectional views showing the guard employed to prevent ravelings or thin narrow clippings or strips from entering the slot in the bed of the machine. Fig. 6 is an enlarged transverse section of the peripheral portion of the cold-chisel and adjacent anvil. Figs. 7 and 8 are respectively end and side views of the machine as constructed specially for cutting sheet metal.

Similar letters of reference indicate corresponding parts.

A represents the supporting-frame of the rotary cold-chisel and its anvil. Said frame is provided with a suitable clamp C, by which to secure it to the edge of the table, and is formed with an upright rectangular case A', through which extend two horizontal shafts $a\ a'$, arranged parallel one above the other. One end of the lower shaft $a$ is provided with a hand-crank $b$, by which to turn it. To the opposite protruding end of said shaft is fastened the annular cold-chisel $c$, which is confined between a collar $d$ and a nut $d'$, which latter is screwed onto the extremity of the shaft. This rotary cold-chisel is formed of a thick and stout annular steel plate, the periphery of which is beveled abruptly from opposite sides to nearly or quite an obtuse angle, as shown at $o$ in Fig. 6 of the drawings, and forming a cutting ridge which for some purpose may extend in a serpentine direction around the periphery of the plate. Directly over this annular cold-chisel and in the same vertical plane therewith is the annular anvil D for sustaining the part of the sheet to be cut. Said anvil is attached to the end of the shaft $a'$, which is journaled in the ends of the case $A'$, so as to allow it to freely rotate with the aforesaid cold-chisel.

One of the two shafts $a\ a'$, preferably the lower shaft, has the end which is adjacent to the cutter mounted on a vertically-movable journal-box $l$, supported upon an eccentric $l'$, fastened to a shaft $l^2$, which extends transversely through the case $A'$ and has fastened to its outer end a lever $m$, which is connected to a suitable treadle (not shown) by means of a rod $n$.

A spiral spring $o$ is suspended from a bracket $o'$ on the top of the case $A'$ and connected to the free end of the lever $m$ to draw the same upward. Said lever is shown in its depressed position in Fig. 1 of the drawings.

The anvil is formed of fine tool-steel, and the peripheral face thereof is transversely straight and parallel with the axis of the anvil and smooth.

The hard face of the anvil prevents it from being cut by the cold-chisel, with which it is held in direct and uniform contact to positively sever the interposed material.

$t$ represents the work-supporting table or bed, which is secured to the frame A and is provided with a slot $f$, through which the upper part of the cold-chisel protrudes.

The object of attaching the cold-chisel to the lower shaft is to allow the said chisel to be turned by the right hand of the operator and to feed the work from the operator to the machine. In the operation of the machine the sheet to be cut or trimmed is introduced into the bite of the cold-chisel, and when the cutting edge thereof is serpentine, as shown in Figs. 1, 2, 3, and 4 of the drawings, it automatically draws the sheet into the said bite, and in said movement the firmly-supported anvil compels the cold-chisel $c$ to penetrate the sheet and cut or trim the same by a pinching action without danger of breaking the cutting edge and without liability of causing the cut material to adhere to the cutter.

The described smooth-faced anvil may be of sufficient width to allow it to be used with cutters of various widths. Hence the machine is adapted to be adjusted for cutting strips of different width and with different-shaped edges simply by the employment of cutters of various shapes connected interchangeably to the shaft $a$.

When the cold-chisel has its cutting edge extending straight around the periphery and is to be used for cutting sheet metal, I employ in connection with said cold-chisel suitable feed-rolls R R, which receive the sheet between them and force it forward into the bite of the cold-chisel. Said feed-rolls are geared together, as indicated by dotted lines 1 2 3 4 in Figs. 7 and 8 of the drawings.

$g$ denotes a gage which is adjustably connected to the frame to control the width of the strip to be cut from the sheet. To guard against the drawing of the cuttings down into the slot $f$ by the downwardly-traveling portion of the serpentine edge of the cutter crimping said cuttings and tending to push the same down into said slot, I adjustably connect to the top of the table $t$ a flat plate $h$, preferably pivoted at one end and provided at the opposite end with a downwardly-projecting screw-stud $h'$, which passes through a slot $i$ in the table $t$ and is provided with a nut $j$, by which to clamp said plate in its required position, as illustrated in Figs. 4 and 5 of the drawings.

What I claim as my invention is—

1. In a cutting device, the combination with a suitable casing, of two vertically-movable shafts mounted in the same, a circular anvil mounted on one of said shafts, a circular cutter mounted on the other shaft, a lateral shaft journaled in said casing, an eccentric mounted on said shaft and adapted to engage the lower cutter-shaft to raise and lower the same, a lever mounted on the lateral shaft, a spring connecting said lever to the casing to hold it normally up, and means connected to said lever for depressing it to cause the eccentric to raise the cutter-shaft, substantially as described.

2. In a cutting device, the combination with a suitable casing, of a supporting-table provided with a longitudinal and a segmental slot, vertically-movable shafts mounted in said casing, a circular anvil mounted on one of said shafts, a circular cutter mounted on the other shaft and adapted to project through the longitudinal slot in the table, a pivoted guard mounted on said table having a screw-threaded stud projecting through the segmental slot and an adjusting-nut on the lower end of said stud for clamping said guard-lever in the desired position over the longitudinal slot, substantially as described.

3. In a cutting device, the combination with a suitable casing, of vertically-movable shafts mounted in the same and each provided with an annular groove, bearing-blocks lying in the grooves of said shafts respectively, a screw for adjusting the upper bearing-block, a lateral shaft mounted in the casing, an eccentric mounted on said shaft and engaging the lower bearing-block, means for rotating the lateral shaft, an eccentric to raise or lower the lower shaft, an anvil mounted on one of said vertically-movable shafts, and a cutter mounted on the other, substantially as described.

4. In a cutting device, the combination with a suitable casing, of a yoke-clamp provided with a thumb-screw for securing said casing to a table or other article, two vertically-movable shafts mounted in said casing, a crank mounted on the end of one of said shafts, a circular anvil mounted on one of said shafts, a circular cutter mounted on the other shaft, a bearing-block engaging the lower shaft, an eccentric mounted in the casing and adapted to engage said bearing-block to raise or lower the same, and means for operating said eccentric, substantially as described.

In testimony whereof I have hereunto signed my name this 22d day of May, 1896.

HENRY A. HANNUM. [L. S.]

Witnesses:
 J. J. LAASS,
 H. B. SMITH.